Aug. 28, 1923.

S. H. TODD 1,466,070

THERMOSTAT

Filed March 18, 1921

2 Sheets-Sheet 2

Inventor
Samuel H. Todd
By Geo. E. Tew Atty.

Patented Aug. 28, 1923.

1,466,070

UNITED STATES PATENT OFFICE.

SAMUEL H. TODD, OF DETROIT, MICHIGAN.

THERMOSTAT.

Application filed March 18, 1921. Serial No. 453,483.

*To all whom it may concern:*

Be it known that I, SAMUEL H. TODD, a citizen of the United States, residing at Detroit, in the county of Wayne and State of Michigan, have invented a certain new and useful Improvement in Thermostats, of which the following is a full, clear, and exact description, reference being had to the accompanying drawings.

This invention relates to thermostats for the control of an electric switch or other operating device in accordance with temperature conditions, and especially for use in connection with heating and cooling systems such as water heaters, coffee urns, house heating systems, and refrigerating apparatus. The desirability of such a device has long been appreciated but prior devices have ordinarily had the disadvantage of exhibiting an unduly wide spread between the maximum and minimum temperatures, unless made very delicately in which case they are unduly subject to derangement. Besides they have been unduly subject to tampering by unskilled persons.

Accordingly the objects of the present invention are the provision of a thermostat of very great sensitiveness, very small temperature spread, capable of ready adjustment by those who know how to adjust it and immune from tampering by unskilled persons; one which shall be safe from damage by internal pressure or external cold; one which shall be simple and rigid in construction and cheap to manufacture; one in which a minimum number of springs, levers and other moving parts is employed, and such moving parts as exist are caused to operate in a straight line so as to minimize any binding or sticking of the apparatus; while further objects and advantages of the invention will become apparent as the description proceeds.

Figure 1:
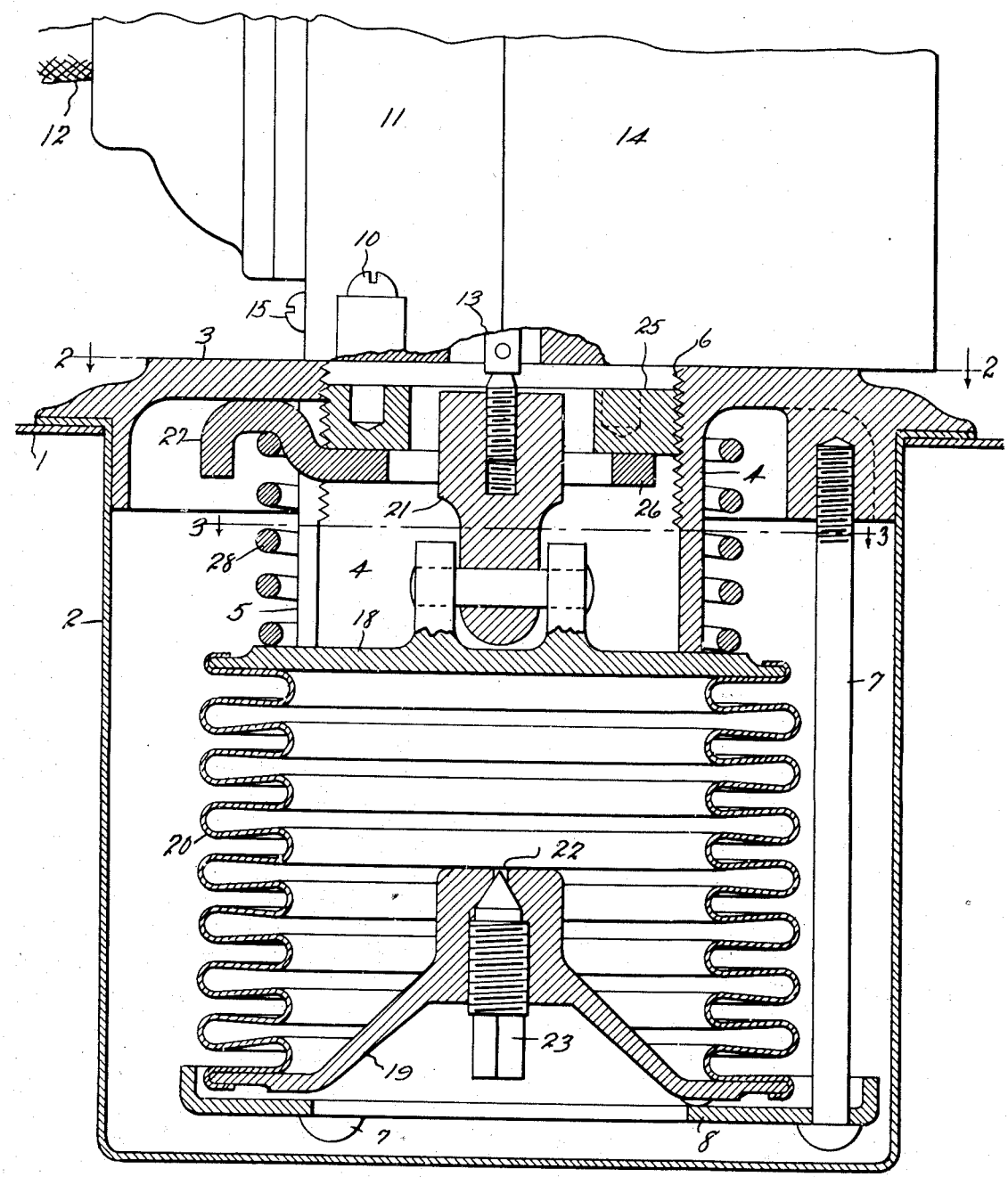
Figure 2:
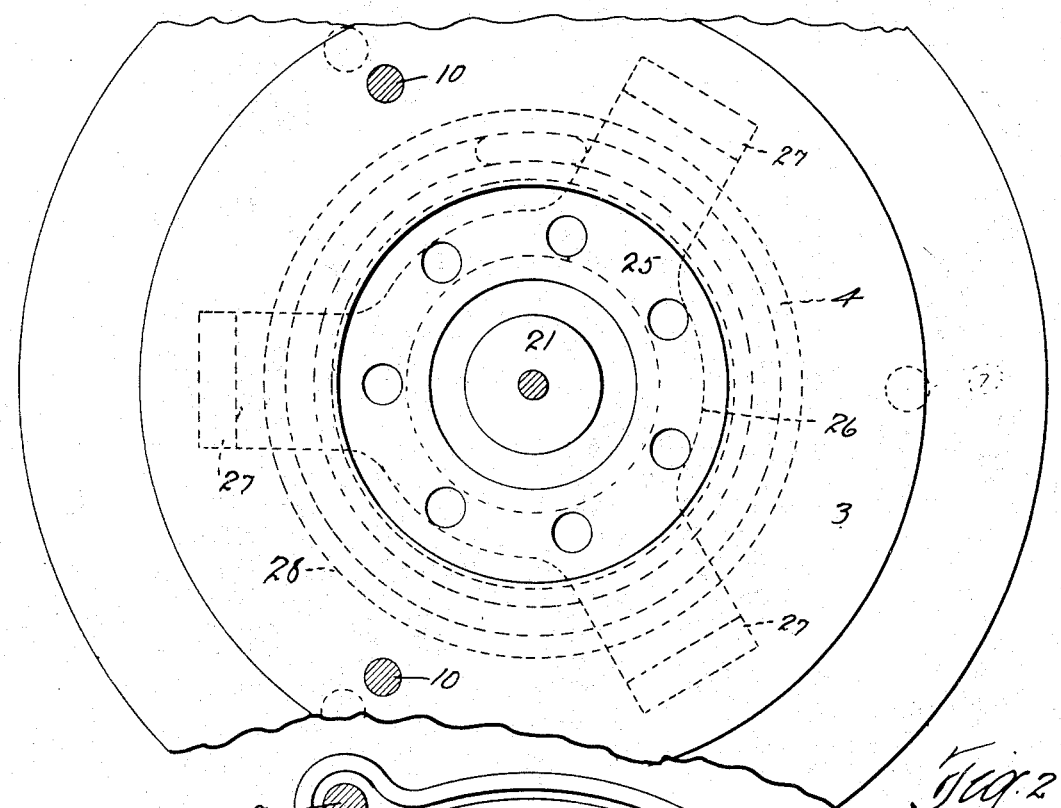
Figure 2:
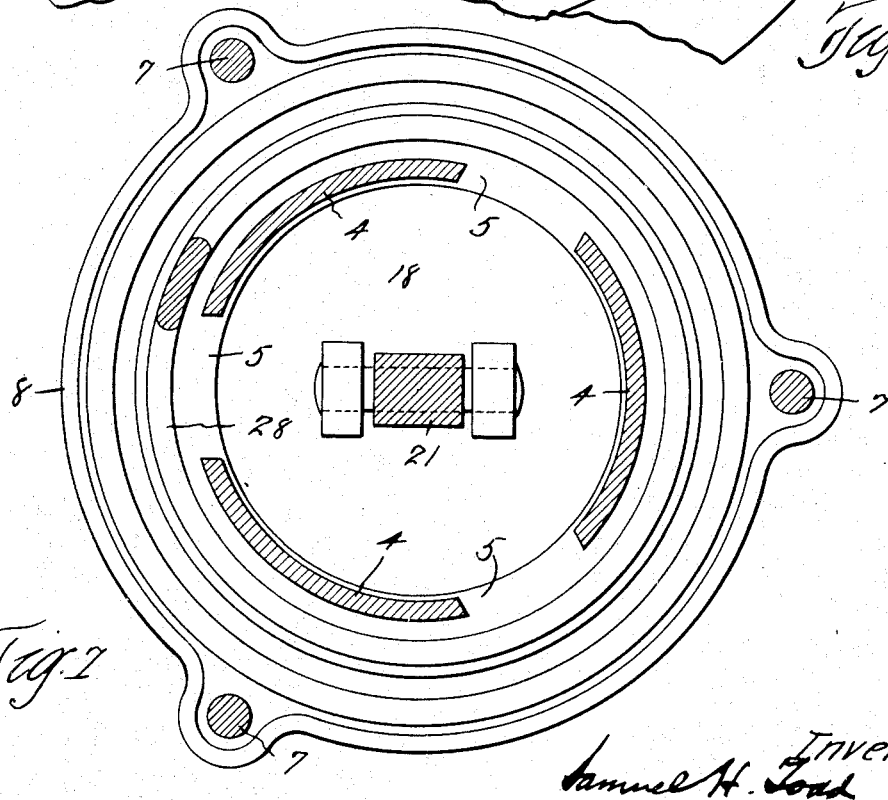

In the drawings accompanying and forming a part of this application I have illustrated one embodiment of my said invention, although without intent to restrict myself thereto. In these drawings Fig. 1 is a vertical central sectional view through the operating parts of my improved thermostat showing the same associated with a liquid containing tank such as a coffee urn or the tank of a refrigerating apparatus; Figs. 2 and 3 are sectional views corresponding to the lines 2—2 and 3—3 respectively of Fig. 1 and looking downwardly.

Describing by reference characters the parts shown in these drawings, 1 represents the top wall of a coffee urn, brine tank, or the like, in which is hermetically secured the depending, sheet-metal well 2. Secured over the top of this well is a cap or annular member 3 having a central opening surrounded by a cylindrical flange 4 formed with three longitudinal slots 5—5 (more or less) and provided at its upper end with internal screw-threads 6. Threaded into the outer portion of this cap are a plurality of depending studs 7—7, here three in number, to whose lower ends are attached the base plate 8. Also secured to the upper face of the plate 2, as by screws one of which is shown at 10, is the base part 11 of a controlling device such as an electric switch to which is connected a flexible cord 12. The interior construction of this switch is not important to the present invention except that it be of a type wherein opening and closing is produced by the longtudinal movement of a member 13 which is located in line with the axis of the flange 4. I prefer to employ a switch of the internal construction described and claimed in my application Serial No. 453,484 filed March 18, 1921, but do not restrict myself thereto; and I also prefer to employ a switch housing having a portion as shown at 14 which is detachably connected to the base 11 as by the screws 15 so that upon such detachment the threaded aperture 6 becomes at least partly uncovered and so that when attached said aperture will be completely covered.

Interposed between the plate 8 and the lower end of the flange 4 is an expansible vessel having circular end plates 18, 19 and a longitudinally-flexible, circumferentially-corrugated, sheet-metal wall 20 hermetically secured thereto. The upper plate 18 is connected by means of a suitable fitting 21 with the member 13; and the opposite end plate 19 is provided with a suitable filling opening such as that shown at 22 and closed by a screw plug 23. Screwed in the aperture 6 is the adjusting disk 25 through which the member 21 passes freely, and beneath this disk is a non-rotatable ring 26 provided with the radial fingers 27 equal in number to the slots 5 and projecting freely therethrough. Surrounding the flange 4 is a helical spring 28 having its lower end seated upon the plate 18 and its upper end seated against the fingers 27 which are suitably curved to receive the same.

The expansible vessel is filled with a volatile liquid whose boiling point corresponds approximately with the temperature for which the device is constructed, and the switch is so adjusted as to be actuated in one direction just before the plate 18 comes into contact with the lower end of the flange 4, and to be actuated in the opposite direction upon the downward movement of said plate a predetermined distance therefrom. Which one of these movements shall effect a closing of the switch and which an opening thereof depends upon the use to which the thermostat is applied, being different for a cooling apparatus than for a heating apparatus; thus in the case of a refrigerating apparatus the arrangement is such that the contacts will be closed upon the expansion of the vessel caused by an increase of temperature, thus producing an actuation of the compressor so as to reduce such temperature; while the opposite arrangement is employed in the case of a water heater, steam boiler, or similar appliance wherein the temperature is higher than the normal. Excessive temperatures can exercise no injurious effect inasmuch as the expansion of the vessel is limited by the flange 4 operating in conjunction with the stud 7; and adjustment is easily effected by removing the switch cover 14 and turning the disk 25 by the use of a suitable tool; while neither frost, steam, water, heat, or cold can clog the apparatus.

It will be understood that I do not restrict myself to the details of construction and arrangement as herein shown except as the same are positively recited in my claims since many changes in detail can be made.

Having thus described my invention what I claim is:

1. In a device of the character described the combination, with an annular member having a longitudinally slotted flange surrounding its central hole, the interior of said flange being threaded, of an adjustable disk screwed in said flange, a ring seated against said disk having arms projecting through said slots, a base plate spaced from said annular member, means rigidly securing said plate and member together, a longitudinally expansible vessel interposed between said plate and the end of said flange, a spring interposed between the end of said vessel and said arms outside of said flange, a controlling device secured to the opposite side of said member, and operative connections between said vessel and controlling device.

2. In a thermostat, an annular member having a circular flange, a base plate spaced from and rigidly secured to said member, the flange being internally threaded and having longitudinal slots, an annular disk adjustably screwed in said threads, a ring inside said disk having arms projecting through said slots, a spring surrounding said slotted flange and bearing against said arms, a longitudinally expansible vessel interposed between said spring and base plate, an operating member secured to said vessel and traversing said disk, and a controlling device secured to said annular member and connected to said operating member.

3. In a thermostat, an annular cap having a longitudinally-slotted internally-threaded, cylindrical flange surrounding its central opening, an annular adjusting disk threaded into said flange, a plurality of studs secured to said cap outside of said flange, a base plate carried by said studs at a distance from said flange, a longitudinally expansible member interposed between said base plate and the end of said flange, a spring bearing on one end of said member and surrounding said flange, and a member located between said disk and vessel having arms which extend through the slots and engage the opposite end of said spring.

4. In a thermostat, a cap having a cylindrical threaded flange projecting from one side, a base plate spaced from the end of said flange, securing means for said base plate attached to said cap outside of said flange, a longitudinally expansible vessel interposed between said plate and flange, a spring surrounding said flange and having one end bearing on said vessel, an adjusting disk screwed to said flange and adapted to be operated from the other side of said cap, a controlling device carried by the said of said cap opposite said vessel, operative connections between said controlling device and vessel, and means permitting the adjustment of said disk from the side of said cap which carries said controlling device.

5. In a thermostat, a cap having a cylindrical threaded flange projecting from one side, a base plate spaced from the end of said flange, securing means for said base plate attached to said cap outside of said flange, a longitudinally expansible vessel interposed between said plate and flange, a spring surrounding said flange and having one end bearing on said vessel, an adjusting disk screwed to said flange, a non-rotatable ring engaging said adjusting disk on the one part and engaging said spring on the other part, said flange being longitudinally slotted and said ring being fingered whereby rotation is prevented, a controlling device secured to the side of said cap opposite said vessel, and operating means connecting said controlling device to said vessel.

6. In a thermostat, in combination, a flat-topped circular cap having a hole therein and a threaded flange surrounding the hole, switch base secured to the top of said cap and overhanging said hole and having an operating member projecting through said hole, an expansible vessel located beneath said cap and connected to said member, a spring surrounding said flange and bearing on said vessel, an adjusting disk screwed to said flange and supporting the other end of said spring, said disk having tool-receiving provisions whereby it may be rotated and a removable part detachably secured to said switch and cooperating therewith to cover said hole and conceal the adjusting disk.

In testimony whereof, I hereunto affix my signature.

SAMUEL H. TODD.